United States Patent [19]

Nemoto et al.

[11] Patent Number: 5,214,622

[45] Date of Patent: May 25, 1993

[54] INFORMATION DISPLAY APPARATUS

[75] Inventors: Yasuhiro Nemoto; Kazuo Sakai, both of Ibaraki; Masataka Kawauchi, Ishioka; Hideki Tanaka, Tsuchiura; Kihachiro Tanaka, Ushiku; Hiroshi Ohki, Tsuchiura; Ichiro Nakamura, Katsuta; Hideo Enoki, Ibaraki, all of Japan

[73] Assignee: Hitachi, Ltd., Tokyo, Japan

[21] Appl. No.: 691,853

[22] Filed: Apr. 26, 1991

[30] Foreign Application Priority Data

Apr. 27, 1990 [JP] Japan .................................. 2-112552

[51] Int. Cl.$^5$ ..................... G04B 47/00; G04B 19/24; H04Q 1/00
[52] U.S. Cl. .......................................... 368/10; 368/28; 340/825.69; 340/825.72; 358/194.1
[58] Field of Search ..................... 368/10, 47; 358/93, 358/194.1, 335; 364/569; 340/825.69, 825.72

[56] References Cited

U.S. PATENT DOCUMENTS

| | | |
|---|---|---|
| 3,898,644 | 8/1975 | Baxter .................................. 368/10 |
| 4,600,918 | 7/1986 | Belisomi et al. ..................... 340/711 |
| 4,837,719 | 6/1989 | McIntosh et al. ................... 364/569 |
| 4,989,081 | 1/1991 | Miyagawa et al. ..................... 358/93 |
| 4,993,003 | 2/1991 | Fechner et al. ......................... 368/47 |

Primary Examiner—Vit W. Miska
Attorney, Agent, or Firm—Antonelli, Terry, Stout & Kraus

[57] ABSTRACT

An information display apparatus which accumulates arbitrary information inputted to a television receiver from the outside, superimposes the information in a memory on an ordinary video signal and displays the superimposed image on a television display in accordance with a calender timer built in the television receiver. A remote control unit is provided for inputting information to the information display apparatus from the outside. Memories are disposed in the information display apparatus and the remote control unit for accumulating arbitrary information. A calender timer is provided for serving as a reference for displaying information are also disclosed. Arbitrary information inputted from the outside can be displayed on a television display at a previously appointed date.

13 Claims, 11 Drawing Sheets

INFORMATION DISPLAY APPARATUS

BACKGROUND OF THE INVENTION

1. Field of the Invention

This invention relates to an information display apparatus for displaying arbitrary information inputted from the outside on a television screen, and more particularly, to an information display apparatus for displaying personal schedule or the like so as not to forget it.

2. Description of the Prior Art

There has conventionally been put into practical use and brought to market as good a type of television which is capable of displaying information such as a channel number, a volume, a date and an operating condition of a timer superimposed on an image displayed on a television screen.

There has also been used a television display having a function of displaying a reproduced image from a video signal (for example, a television signal) and superimposing an additional reproduced image from another video signal (for example, an external video signal) on a particular location of the former reproduced image, for example, as disclosed in JP-A-Hl-86772. It is thought that the necessity of such techniques for displaying a further video signal superimposed on a basic video signal on the screen of a television display will increase in the future.

A desired information display apparatus is capable of appropriately displaying personal or family information according to need. Such apparatus would be quite effective in these days of excessive information for schedule management and prevention of troubles due to simple mistakes such as forgetting.

Particularly, among aged people who forget more frequently with advance of age, the anxiety about forgetting often becomes the topic of a conversation.

A television display is most appropriate as an apparatus which can be installed in house and utilized also in the future for eliminating such anxiety.

However, conventional televisions of a type which is capable of displaying two image signals, one of which is superimposed on a particular area of the other, do provide a method for displaying inputted arbitrary information according to the date or day of week, whereby it is not possible to store, for example, a personal schedule or the like in a memory and automatically display the same when it is necessary.

SUMMARY OF THE INVENTION

It is a first object of the invention to provide an information display apparatus which is capable of displaying arbitrary information inputted from the outside on a television screen in accordance with a previously designated display program.

It is a second object of the invention to provide an information display apparatus which is provided with an information display means for changing the degree of attention paid to information in accordance with an information display program.

It is further a third object of the invention to provide an information display apparatus which is provided with an easy-to-manipulate remote control unit capable of automatically transferring inputted information.

To achieve the above-mentioned objects, the present invention proposes an information display apparatus comprising a memory for storing arbitrary information, to which is added at least a display desired date, inputted from the outside, a calender timer for generating a time signal such as the date, and means for synthesizing the information stored in the memory and a television image and displaying the synthesized image at a predetermined time based on the time signal generated by the first calender timer and the desired display period.

The present invention also proposes an information display apparatus comprising a remote control unit including a second memory for storing arbitrary information, to which at least a desired display period is added, inputted from the outside, a second calender timer for generating a time signal such as a date, and means for transferring information stored in the second memory to an information display unit body in accordance with a time signal generated by the second calender timer, and the information display unit body including a first memory for storing the transferred information, a first calender timer for generating a time signal corresponding to the second calender timer of the remote control unit, and means for synthesizing information stored in the first memory and a television image and displaying the synthesized image on a television display in accordance with the time signal generated by the first calender timer.

The means for synthesizing information stored in the first memory and a television image can change at least one of display contents of the information read out of the first memory and a display method in accordance with the first calender timer.

The information display apparatus also comprises means for automatically starting a display mode and displaying necessary information when the first calender timer indicates the arrival of a time at which information is to be displayed even out of the television broadcasting time or even if the information display apparatus body is being used for displaying information other than television programs.

The information display apparatus further comprises means for automatically turning on the power supply to a television display when the first calender timer indicates a time at which information is to be displayed and starting a display mode to display necessary information, and means for selecting, when a previously set display period has elapsed, one of automatically turning off the power supply and maintaining information to be displayed.

In either case, displayed information may be continuously stored in the first memory for a predetermined period for a confirmation after it has been erased from the screen.

It is desirable to provide either one of the second calender timer comprised in the remote control unit and the first calender timer comprised in the main body with means for transmitting a synchronizing signal to the other calender timer so as to synchronize two calender times.

The remote control unit and the main body may be provided with slots for inserting memory cards for transmitting exchange information therebetween and directly exchanging information between them and external apparatus, and a communication cable connection means for transmitting exchange information therebetween and with external apparatus.

The means for synthesizing information stored in the first memory and a television image may comprise means for selecting at least one of a mode for continuously displaying information read out of the first memory for a predetermined time after the power supply to the information display apparatus is turned on, a mode for always or intermittently displaying information in the first memory at a display appointed date of the information or within a separately designated display period, and a mode for displaying information every time a remote control manipulation such as a channel selection of the television, a volume adjustment, etc., is made.

The remote control unit, on the other hand, may be provided with means for selecting at least one of a mode for automatically transferring information stored in the second memory within a time zone in which the remote control unit is rarely manipulated and a mode for automatically transferring information every predetermined time has elapsed or a designated amount of information is accumulated.

For executing a plurality of means of the present invention as mentioned above, the memory stores arbitrary information which is desired to be displayed at an appointed date. The calender time, since it generates the current date and day of week, controls so as to check a display appointed date of information with the current date and display the information when a previously appointed display period has begun, thereby making it possible to display arbitrary information for the previously appointed period.

Also, since means for changing information display method and displayed contents in accordance with an information display schedule is provided, the degree of attention paid to information can be changed in accordance with a display schedule, thereby reducing a fear that important information is missed.

Further, the remote control unit, used commonly as an information input device, is provided with the second calender timer which enables inputted information to be transferred to the information display apparatus body at an appointed time, whereby the inputted information is transferred without failure even if the user does not particularly pay attention to the transfer.

The present invention can achieve the aforementioned objects by providing the above-mentioned means, and therefore inputted arbitrary information can be displayed on a television screen at a predetermined timing, thereby reducing a fear the user forgets important schedule, events and so on.

The present invention also changes an information display method and displayed contents in accordance of a previously designated information display schedule, which allows the user to discriminate the importance of information at a first glance, thereby further reducing a fear that necessary information is missed.

It is further possible to designate a display method appropriate to each information viewer, for example, changing a displayed color so as to allow aged people to easily understand, adjusting a display timing, and so on, which results in producing effects such as providing an easy-to-manipulate information display apparatus for the user.

In addition, the remote control unit of the information display apparatus is used commonly as an information input means which is adapted to automatically transfer inputted information, whereby the inputted information is certainly transferred to the information display unit body without making the user consider the transfer, thus resulting in further facilitating the manipulation.

DESCRIPTION OF THE PREFERRED EMBODIMENTS

An embodiment of an information display apparatus according to the invention will hereinbelow be explained with reference to the accompanying drawings.

Figure 1:
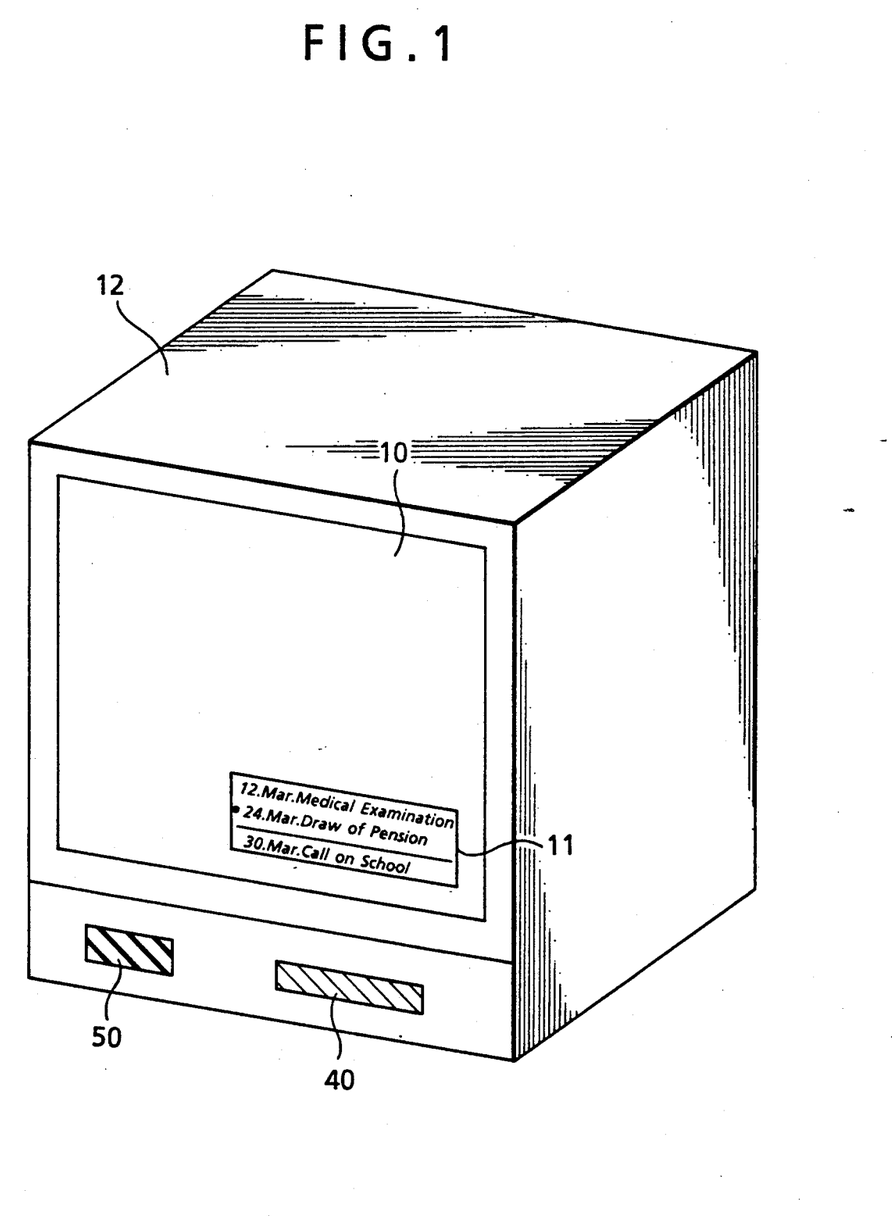
FIG. 1 is a perspective view showing the appearance of an embodiment of an information display apparatus according to the invention.

FIG. 1 is a perspective view showing the appearance of an embodiment of an information display apparatus according to the present invention. In FIG. 1, an information display unit body 12 has a memory information display section 11, for example, on a lower right portion of a television screen 10. The body 12 is provided, for example, below the television screen 10 with a memory card slot 40 for inserting an external memory such as a memory card, not shown, and a wireless receiving area 50 for receiving inputted information from a remote control unit 20, later referred to with reference to FIG. 3.

The shape, used color, a position on the television screen 10 and so on of the memory information display section 11 can be freely modified by instructions from an input means such as the remote control unit 20. Actually, several combinations of shapes, colors, positions and so on, which may be thought appropriate to the memory information display section 11, have been previously prepared such that the user can select either one of the combinations.

Figure 2:
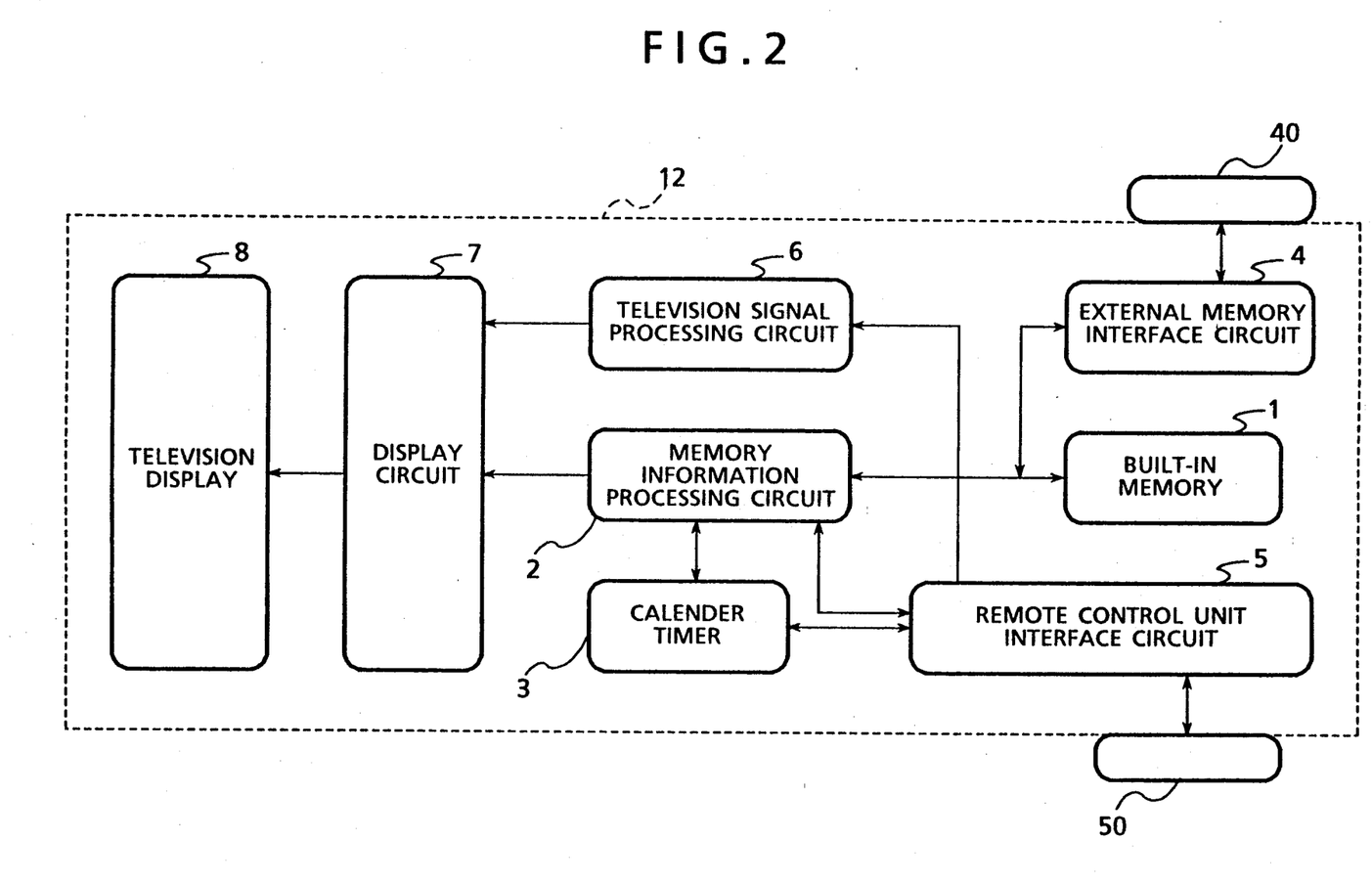
FIG. 2 is a block diagram showing the structure of an embodiment of a signal processing system employed in the embodiment shown in FIG. 1.

FIG. 2 is a block diagram showing the structure of an embodiment of a signal processing system of the embodiment shown in FIG. 1. In FIG. 2, the information display unit body 12 comprises a first memory 1 for storing arbitrary information, an information processing circuit 2 for reading information stored in the first memory 1 and writing information into the first memory 1, and a calender timer 3 for generating signals indicative of a date, a day of week and so on. The first memory 1 has a capacity of approximately 256 kB, by way of example, for providing a sufficient capacity necessary to store events, memorial days, daily schedule and so on of an average family. An external memory interface circuit 4 is also provided which is connected to terminals in the memory card slot 40 for ensuring extendability for a case where a larger capacity of memory is required. A remote control unit interface circuit 5 is further provided for controlling a signal transfer between the wireless receiving area 50 and the remote control unit 20 such that information inputted from an inputting means such as the remote control unit 20 can be readily transferred to the information display unit body 12. Information stored in a second memory is transferred to a display circuit 7 when the memory information processing circuit 2 indicates that signals indicative of date, day of week and so on generated from the calender timer 3 are coincident with a previously appointed display date. The display circuit 7 executes processing for superimposing the memory information on a television image signal processed by a television signal processing circuit 6 and for displaying the superimposed image on a television display 8.

The size of the memory information display section 11 can be automatically determined in the memory information processing circuit 2 in accordance with an amount of information to be displayed. A timing for displaying the memory information display section 11 can be arbitrary set in advance. For an easy operation, it is thought to select one of the following modes or combine the same:

(1) A mode in which the memory information display section 11 is displayed for a predetermined time after the information display unit body 12 is turned on;

(2) A mode in which the memory information display section 11 is continuously or intermittently displayed at an appointed display date and for a separately set display period; and (3) A mode in which the memory information display section 11 is displayed every time a remote control manipulation such as a television channel selection and a volume adjustment is performed.

It is preferable that a display appointed date for displaying information stored in the memory 1 is checked with the current time, date, day of weeks and so on, and a display manner is changed in accordance with the relation between the current time and the display designated date: for example, memory information is displayed in blue if the display appointed date is more than one week after the present day, in yellow if the appointed date is one or two days after the present day, and in red or in a blink manner if the appointed date is the present day, whereby the degree of urgency is understood at the first glance.

Further, more attention may be paid if displayed contents are changed conforming to designated patterns such as "It is six o'clock. You have to take a medicine in thirty minutes.", "It is six thirty. Have you taken a medicine?", and so on, or if urgent information is displayed with larger characters than other information, as shown in the memory information display section 11 in FIG. 1.

When an appointed date has passed, information displayed from that time is erased after a predetermined period. It is also possible to immediately erase the information after the appointed date has passed. However, for keeping tracks of displayed information, it is also possible to employ a method of erasing the displayed information from the first memory 1 disposed in the display unit body 12 after it has been written into a backup memory card inserted into the external memory slot 40 through the external memory interface circuit 4. It will be appreciated that one of various methods may be selected according to the preferences of the user.

Figure 3:
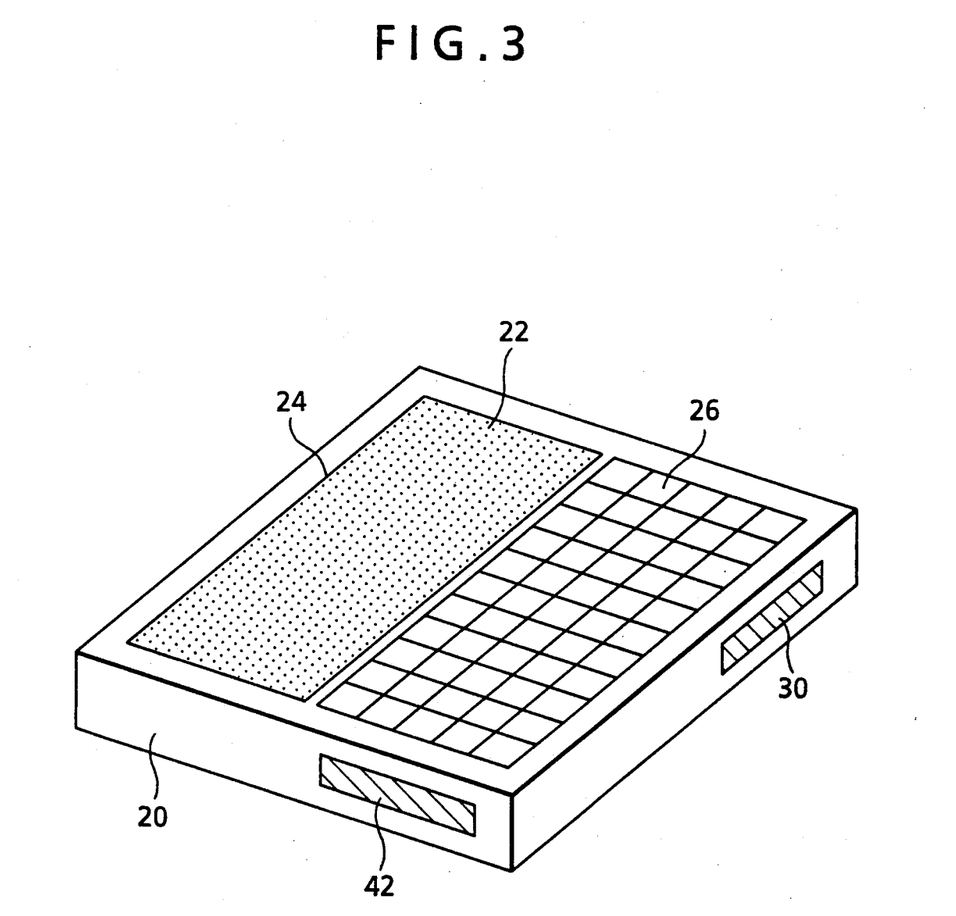
FIG. 3 is a perspective view showing the appearance of an embodiment of a remote control unit used for inputting information.

It is desired for some cases to keep displaying information, even if the appointed date thereof has passed, in a manner that the user can confirm it. For this case, a previously designated mark such as "Terminated" may be added to the head or end of used information by inputting such a mark from input keys or alpha-numerical and symbol keys 26 on the remote control unit 20, later referred to, wherein the mark can be utilized as preferential information for erasing or backing up information, the appointed date of which has passed. The mark is used for example as follows:

a. Information marked with "*" is erased from the first memory 1 after it has been written into the backup memory card;

b. Information marked with "o" is kept displayed for two days after the display appointed date has passed; and c. Information without mark is erased immediately after the display appointed date has passed.

FIG. 3 is a perspective view showing the appearance of an embodiment of the remote control unit 20 used for inputting information. The remote control unit 20 comprises a liquid crystal display 22, a transparent pressure-sensitive pad 24 covering over the crystal display 22, alpha-numerical and symbol keys 26, a communication port, for example, an RS232C port 30, and a memory card slot 42.

Figure 4:
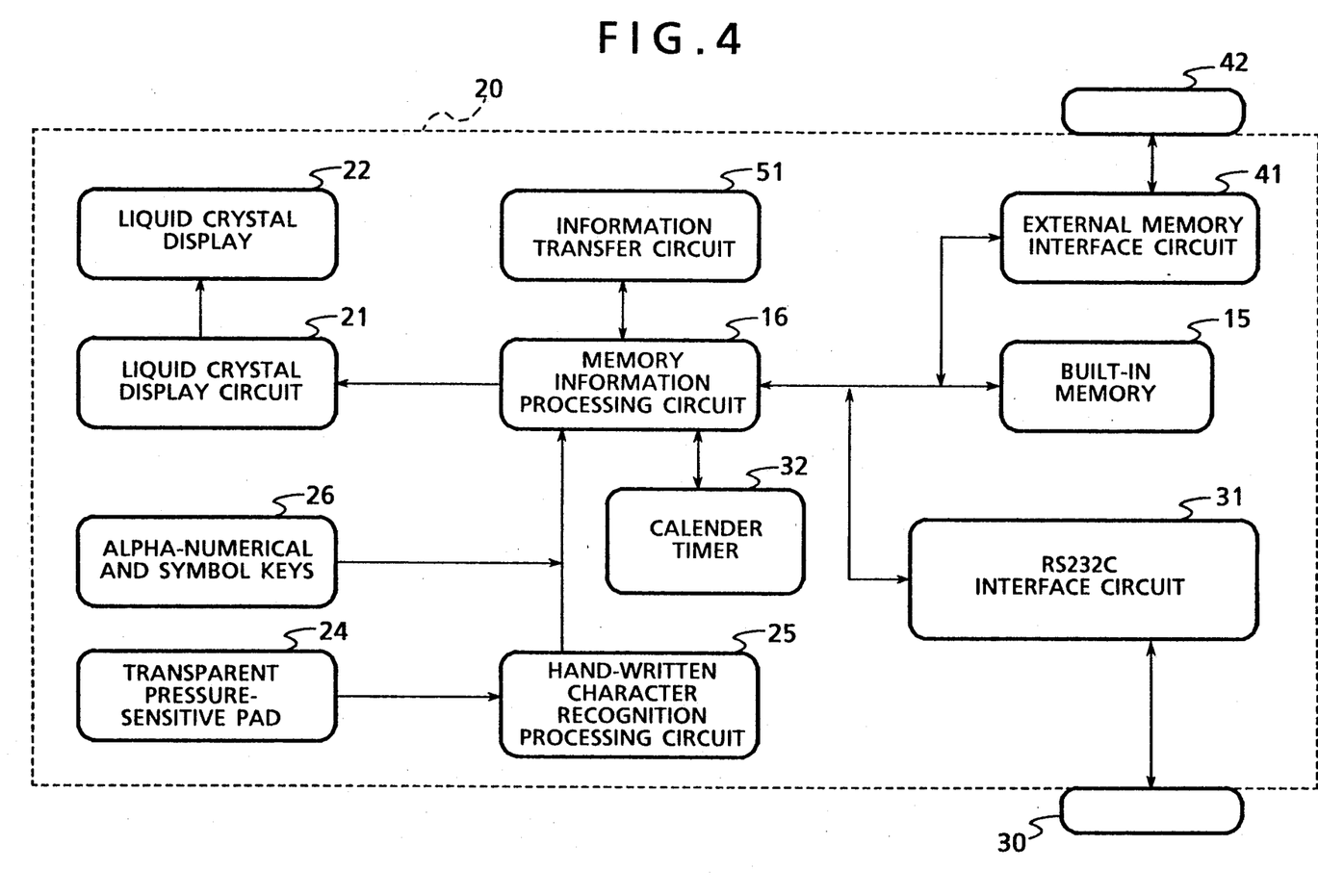
FIG. 4 is a block diagram showing the structure of an embodiment of a signal processing system employed in the remote control unit shown in FIG. 3.

FIG. 4 is a block diagram showing the structure of an embodiment of a signal processing system employed in the remote control unit 20 shown in FIG. 3. The remote control unit 20 comprises a built-in memory 15, a memory information processing circuit 16, a liquid crystal display circuit 21, a hand-written characters recognition processing circuit 25, an RS232C interface circuit 31, a calender timer 32, an external memory interface circuit 41, and a wireless information transfer circuit 51.

Information is inputted to the remote control unit 20 by hand-writing on the transparent pressure-sensitive pad 24 covering over the liquid crystal display 22 with a special pen, not shown. The handwritten character recognition processing circuit 25 performs a chinese character conversion and graphic processing to thereby convert inputted information to a form to be stored in the built-in memory 15. Information may be also inputted by the alpha-numerical and symbol keys 26. The alpha-numerical and symbol keys 26 are also used as keys for inputting remote control manipulations such as a channel selection, a volume control and so on. Incidentally, with a recent wide spread of personal computers, word processors, electronic note book and so on in family, the remote control unit 20 of the embodiment is provided with the RS232C port 30 and the RS232C interface circuit 31 for enabling a common use of information among these apparatus and the information display apparatus of the invention, whereby information is interchangeable with the above-mentioned various kinds of information processing apparatus through an RS232C cable. If a word processor, a personal computer or the like is provided with a memory card interface which enables a common use of the memory card of the information display apparatus of the present embodiment, information can be directly transferred therebetween by means of the memory card.

The remote control unit 20 is adapted to commonly use a memory card inserted into the memory card slot 40 of the information display unit body 12 and to enable an information transfer therebetween by means of the memory card. In a manner similar to a wireless remote control unit of ordinary television for family use, the remote control unit 20 is provided with the wireless information transfer circuit 51 by which displayed information can be wirelessly transferred to the information display unit body 12.

The remote control unit 20 is further provided with the liquid crystal display 22 and the liquid crystal display circuit 21, whereby contents of the built-in memory 15, contents of a memory card inserted into the memory card slot 42, and contents of information transferred through the RS232C interface circuit 31 can be displayed on the liquid crystal display 22 for confirmation, modification and so on. Information thus inputted may be transferred to the built-in memory 1 in the information display unit body 12 in a batch manner, however, a large amount of inputted information, because of a long time required for its transfer, may cause a trouble if the remote control unit 20 is to be manipulated during an information transfer. An information transfer may be sometimes forgotten due to a manipulation mistake or the like. To cope with such troubles, the remote control unit 20 is provided with the calender timer 32 which is settable so as to automatically transfer information blocks at respective appointed dates in the order of the appointed dates closer to the present date. The automatic transfer may be designated so as to automatically perform information transfers appropriate to the user's daily life for example;

a. The automatic transfer is carried out within a time zone where the remote control manipulation is rarely performed such as midnight and early morning;

b. The automatic transfer is carried out every time a predetermined period, for example, ten minutes have elapsed, or every time a designated amount of information is accumulated.

The inputted information is thus ensured to be transferred to the built-in memory 1 in the information display unit body 12.

Incidentally, it is desirable that the calender timer 32 in the remote control unit 20 is synchronized with the calender timer 3 in the information display unit body 12. Such synchronization is achieved, for example, by transmitting a synchronizing signal generated by the calender timer 32 from the remote control unit 20 through the information transfer circuit 51 to the information display unit body 12 and synchronizing the calender timer 3 disposed in the information display unit body 12 with the received synchronizing signal through the remote control unit interface circuit 5.

Although not shown, the built-in memory 1 and the calender timer 3 of the information display unit body 12 and the built-in memory 15 and the calender timer 32 of the remote control unit 20 are backed up by a long-life battery such as a lithium battery so as not to lose information even in the event of power failure.

Figure 5:
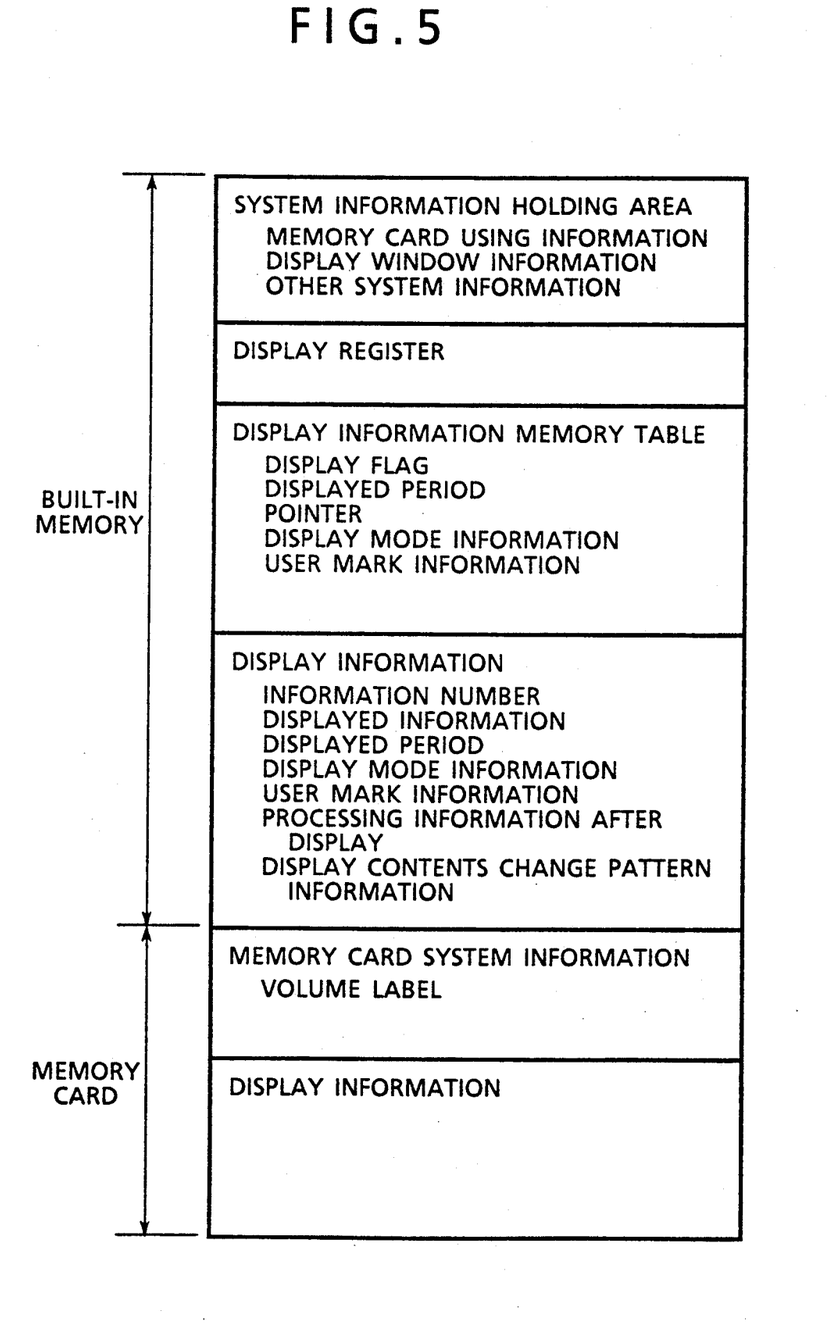
FIG. 5 is a schematic diagram showing an example of a storing area allocation for a memory built in the information display apparatus.

FIG. 5 shows an example of a storing area allocation of the built-in memory 1 in the information display unit body 12. The storing area of the built-in memory 1 is divided into four, i.e., a system information holding area, an information display register area, a display information memory table area, and a display information holding area.

The system information holding area stores memory map information when using a memory card, a remaining amount of the memory, information on position, size, color and so on of a display window, and standard values for automatically setting a variety of items. Items among system information stored in the system information holding area which will not need modification may be stored in a read only memory (hereinbelow called "ROM"), thereby providing a simpler structure of the system.

The information display register area is provided for delivering display information to a display program, later referred to, and information written therein is automatically displayed.

The display information memory table area stores a table including a displayed period of information to be displayed, a display mode such as a display color, a pointer indicative of a memory location in which information to be displayed is stored, user mark information previously set by the user, and so on. This table enables high speed processing for comparing date information generated from the calender timer 3 with an information displayed period since it is not necessary, by using the table, to examine all the memory area every time the comparison is made. Also, since processing for interrupting and erasing a display can be performed by modifying information on this table, it is possible to prevent erroneous erasure of information and do over a manipulation.

The display information holding area stores, in addition to messages to be displayed, information necessary to generate the above-mentioned display information memory table, an information number (a number which is automatically added by the system), information on processing after a display is terminated, information on changing patterns of displayed contents and so on.

A storing area on a memory card is divided into a memory card system information area and a display information holding area, the addresses of which are allocated so as not to overlap the addresses occupied by the built-in memory 1.

The memory card system information area stores system information such as a volume label, a produced date, a remaining memory amount and so on.

The display information holding area in the memory card stores information in the same form as that of the display information holding area in the built-in memory 1. The sizes of such areas are not fixed, and allocated amounts therefor can be modified any time in accordance with an amount of information to be displayed.

Next, a manipulation procedure will be explained with reference to FIGS. 6 to 11.

Figure 6:
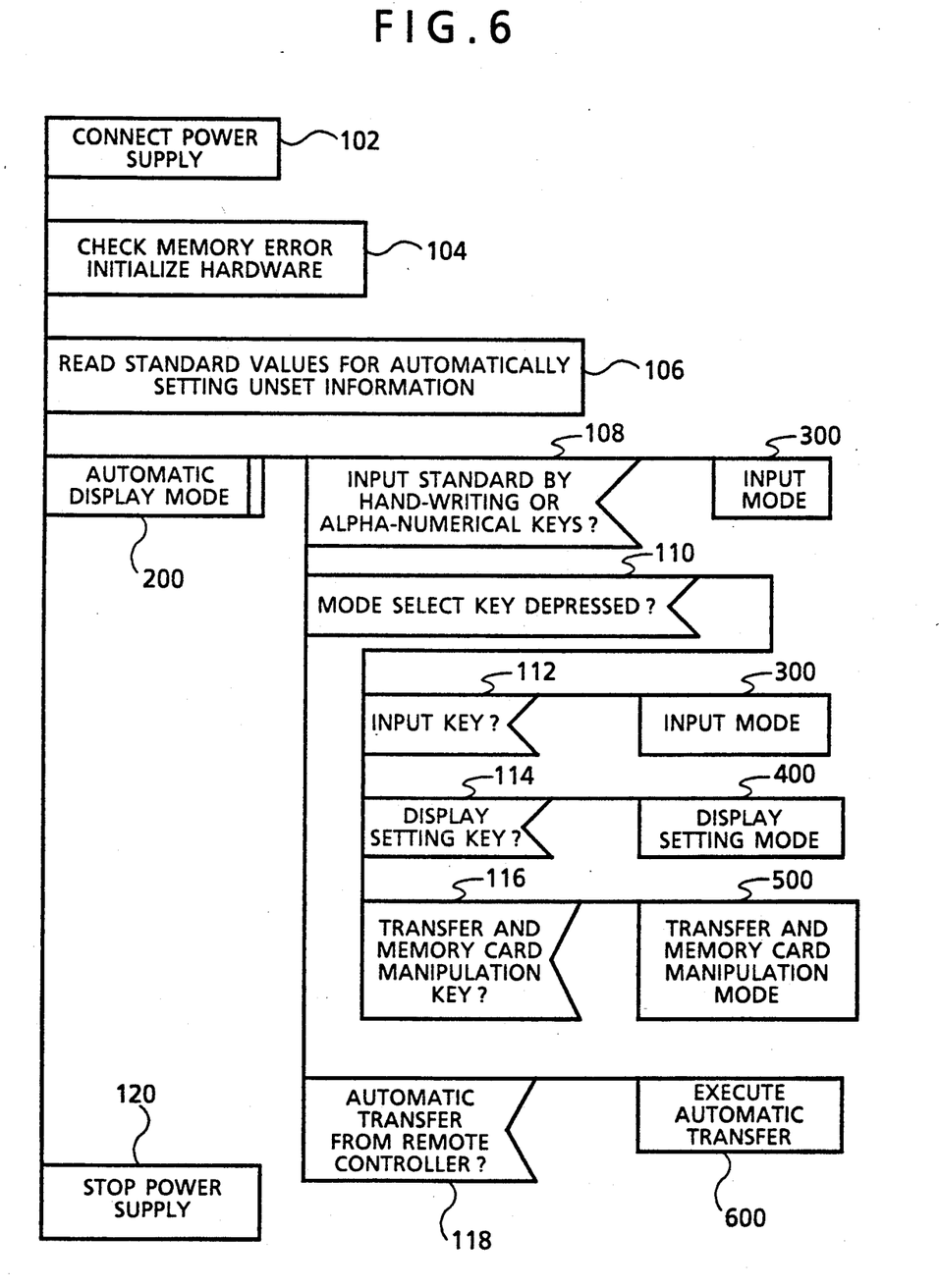
FIG. 6 is a flowchart showing a concept of a manipulation procedure of the embodiment.

FIG. 6 is a flowchart showing a concept of a manipulation procedure of the embodiment. When the information display unit body 12 is connected to a power supply at step 102, the information display apparatus system automatically performs a memory error check and an initialization of counters, registers and so on for manipulation at step 104. Subsequently at step 106, standard values for automatically setting items among a variety of items necessary for display, which have not been set to specific values, are read from the memory to the system. These standard values have previously been set in a system program and are provided in the form of a non-volatile memory such as ROM. The standard values are once read into a random access memory (hereinbelow called "RAM") constituting the system information area of the built-in memory 1 such that a subsequent modification is acceptable thereto, whereby thus set items necessary for display can be modified according to the user's preferences. Then, the information display apparatus system is set into an automatic display mode, later referred to, at step 200, wherein display information existing in the memory is automatically displayed superimposed on another image on the television screen for a designated display period.

Incidentally, although not shown, functions as the television display of the information display unit body 12 are the same as those of an ordinary television display for family use, wherein the user can freely perform a variety of manipulations such as a channel selection, a volume adjustment and so on.

After entering the automatic display mode 200, the information display apparatus system waits for a interrupt signal from the remote control unit 20, in parallel with executing display processing. More specifically, at step 108, the system keeps monitoring whether a handwritten input on the transparent pressure-sensitive pad 24 or an input by the alpha-numerical and symbol keys 26 on the remote control unit 20 is started or not. When a hand-written input on the transparent pressure-sensitive pad 24 or an input by the alpha-numerical and symbol keys 26 is started, the memory information processing circuit 16, as will be later described, delivers an interrupt signal through the information transfer circuit 51 to the information display unit body 12, in accordance with a previously designated transfer mode, to thereby set the system into an input mode at step 300.

On the other hand, at step 110, the system monitors, in parallel with step 108, whether nor not a mode select key on the remote control unit 20 is depressed or not. When it is determined at step 112 that the input key is depressed, the system is set into the input mode at step 300. When it is determined at step 114 that a display setting key is depressed, the system is set into a display setting mode at step 400. When it is determined at step 116 that a transfer system is set into a transfer and memory card manipulation mode at step 500.

Since the remote control unit 20 automatically transfers contents of the built-in memory 15 or those of a memory card to the information display unit body 12 at an appointed time or at intervals of every designated period, it has an automatic interrupt signal which is distinguishable from other interrupt signals. The information display unit body 12 therefore monitors at step 118 the presence or absence of the automatic transfer interrupt from the remote control unit 20. When generation of the automatic transfer interrupt is determined, the system proceeds to an automatic transfer execution at step 600.

After the above-mentioned interrupt and setting of the respective modes have been terminated, the system returns to the automatic display mode at step 200. If the power supply is turned off at step 120, the information display unit body 12 waits for the next step 102 where it is again connected to the power supply while holding a calender timer function and information so far stored. Incidentally, the information display unit body 12 may be provided with a function for automatically turning on the information display unit body 12 and displaying a necessary message when the calender timer 3 indicates the arrival of an appointed time even if the power supply switch of the information display unit body 12 is off with the power supply being connected (the television screen is off), or even out of the television broadcasting time. Also, even when the television is being used, for example, as a display for a video game, a necessary message can be displayed when a display set time is reached.

For example, when a study tine has come while a child is playing a video game, it is possible to display, "It is 5:30 PM. Stop playing the game and begin your study." or the like.

Figure 7:
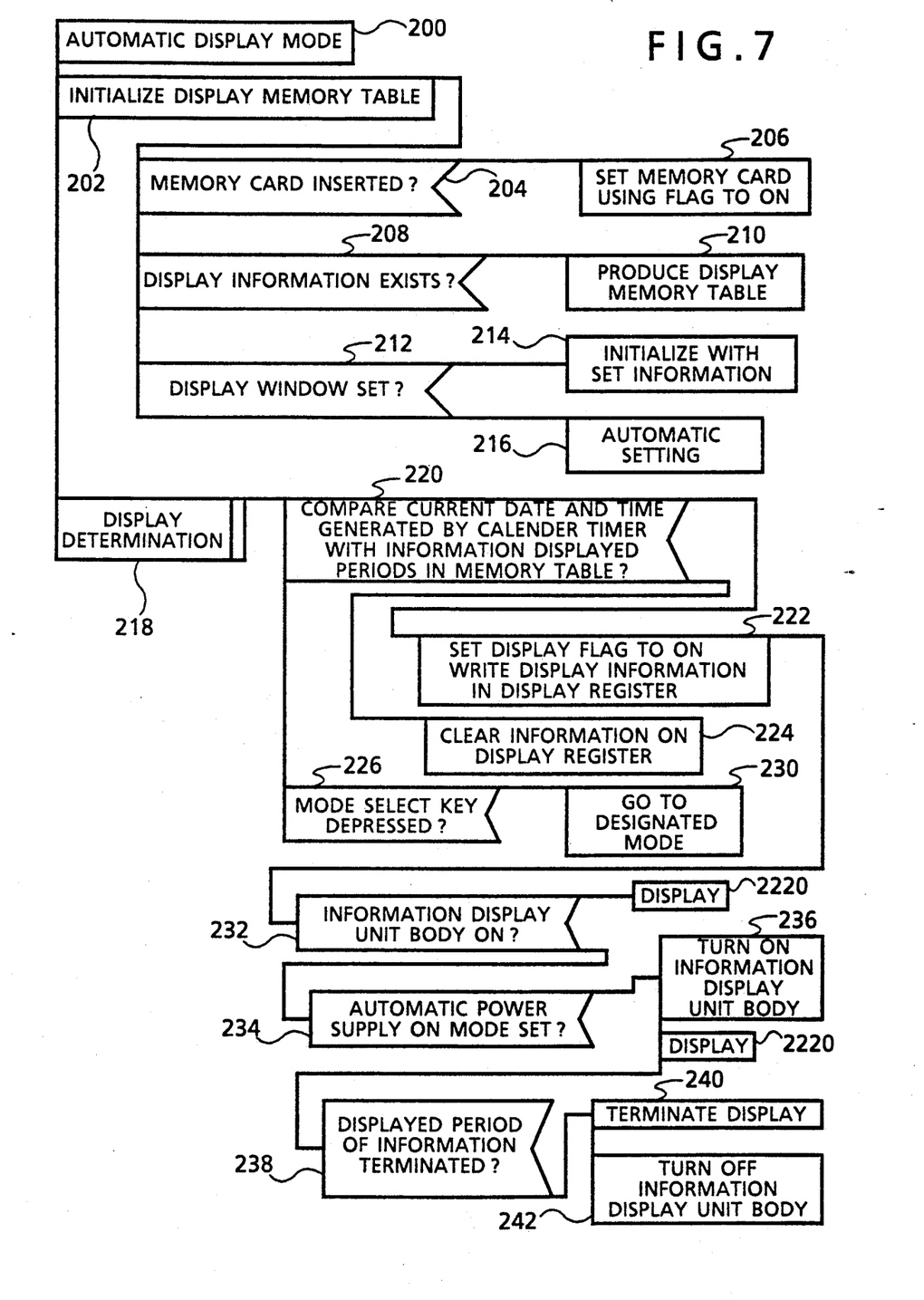
FIG. 7 is a flowchart showing processing executed in an automatic display mode.

FIG. 7 is a flowchart showing operations executed in the automatic display mode. The system, when set into the automatic display mode at step 200, initializes the display information memory table at step 202. Then, the presence or absence of a memory card is checked at step 204. If the memory card is being used, a memory card using flag is set to "on" at step 206.

It is determined at step 208 whether display information exists or not. If the display information exists, the display information memory table is produced on the basis of all information stored in the memory at step 210. Then, it is determined at step 212 whether or not a display window is set. As for information necessary for display which has already been set, corresponding items on the display window are initialized on the basis of the set information at step 214. As for information necessary for display which has not been set, corresponding items on the display window are automatically set to the standard values for automatic setting held in the system information holding area in the memory at step 216.

The system next performs a display determination operation generally designated by step 218. First in this display determination operation, date and time information generated by the calender timer 3 is compared with displayed periods of respective information items on the display memory table at step 220. If there is an information item, the display period of which has begun, a display flag corresponding to the information item in the memory table is set to "on", and display information is read out of the memory based on pointer information in the table and written into the display register. At this time, display information associated therewith is simultaneously read out to perform processing for changing a display color, display contents and so on. Then, it is checked at step 232 whether or not the power supply to the information display unit body 12 is on. If the power supply is on, display is executed at step 220. The information display unit body 12 can be provided with a mode in which the power supply to the information display unit body 12, if in an off condition, is automatically turned on at step 236. This mode can be designated at step 334 shown in FIG. 9, later referred to, wherein display information is set at the time of input. For this operation, it is checked at step 234 whether or not information to be displayed is set so as to automatically turn on the power supply to ±he information display unit body 12. If it is set, the power supply to the information display unit body 12 is turned on at step 236, followed by executing display at step 2220. When a displayed period of information to be displayed has been elapsed, a display termination is determined at step 238, the display is terminated at step 240, the power supply to the information display unit body 12 is turned off at step 242, and the system waits for next information to be displayed.

If the power supply to the information display unit body 12 has been previously on, information is displayed at step 2220. When a displayed period of the information has been elapsed, the display flag on the memory table is set to "off" at step 224, and the corresponding portion in the display resister is cleared. Information on the memory table is erased only when an erasure designated time has reached or when an erasure is manually instructed. Otherwise, the information is maintained unerased for a predetermined period such that the user can reconfirm the information afterward.

Incidentally, in parallel with the operation at step 220 for comparing date and time information generated by the calender timer 3 with display periods of respective information items on the display information memory table, it is determined at step 226 whether or not the mode select key is depressed. If it is depressed, the system is set into the designated mode at step 230.

Figure 8:
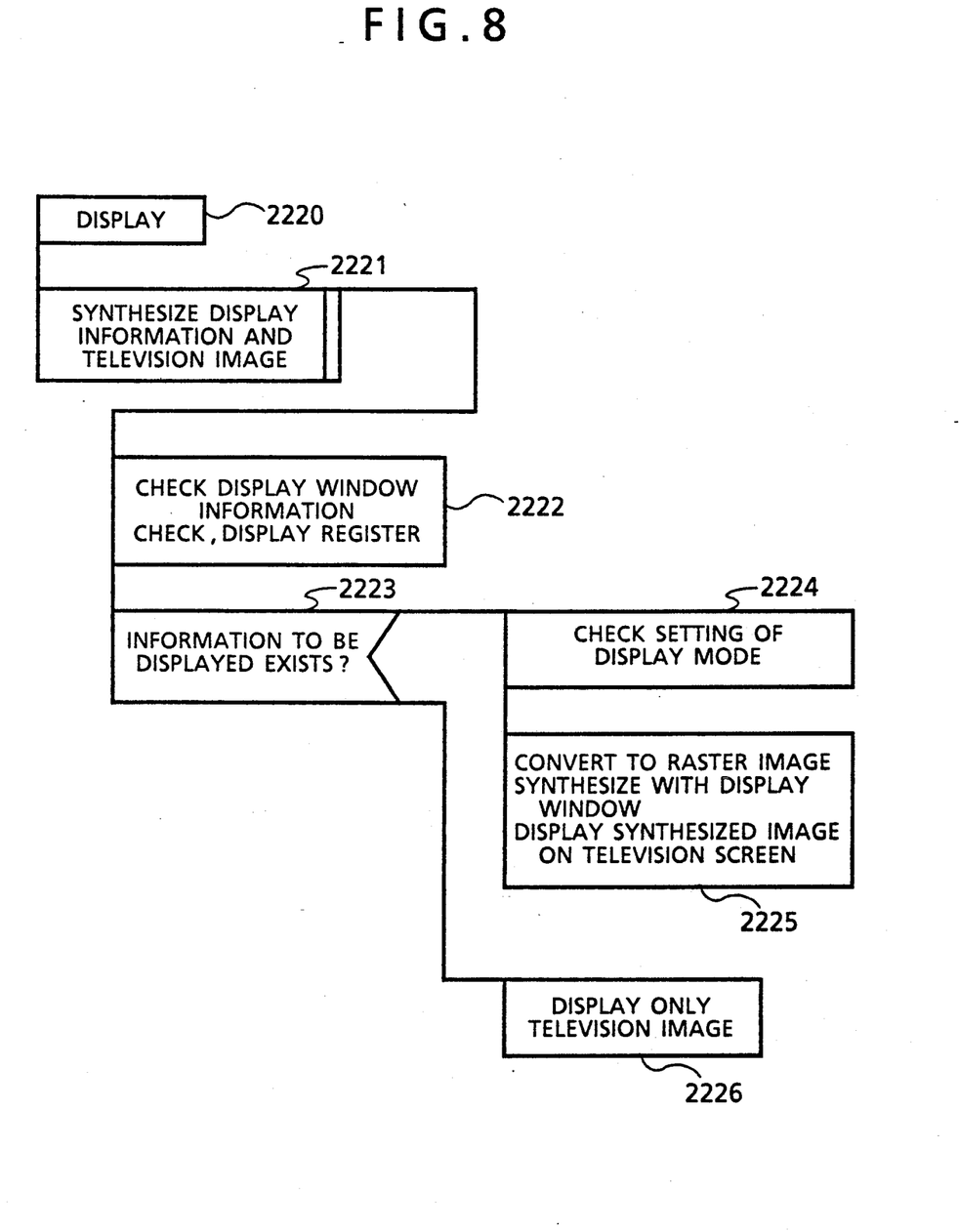
FIG. 8 is a flowchart showing a concept of display processing shown in FIG. 7.

FIG. 8 is a flowchart showing a concept of the display processing 2220 related to step 222 shown in FIG. 7. When the display processing at step 2220 is started, display information and a television image are first synthesized at step 2221. Then, at step 2222, display window information and contents of the display register are checked. It is determined at step 2223 whether or not the display register contains information to be displayed. If there is information to be displayed in the display register, contents set in the display mode is checked at step 2224. Next, at step 2225, information written in the display register is automatically converted to a raster image which is synthesized together with a display window and displayed on a television image. On the other hand, if there is no information to be displayed or information to be displayed has been exhausted in the display register, information in the display window is erased to thereby only display the television image at step 2226.

Figure 9:
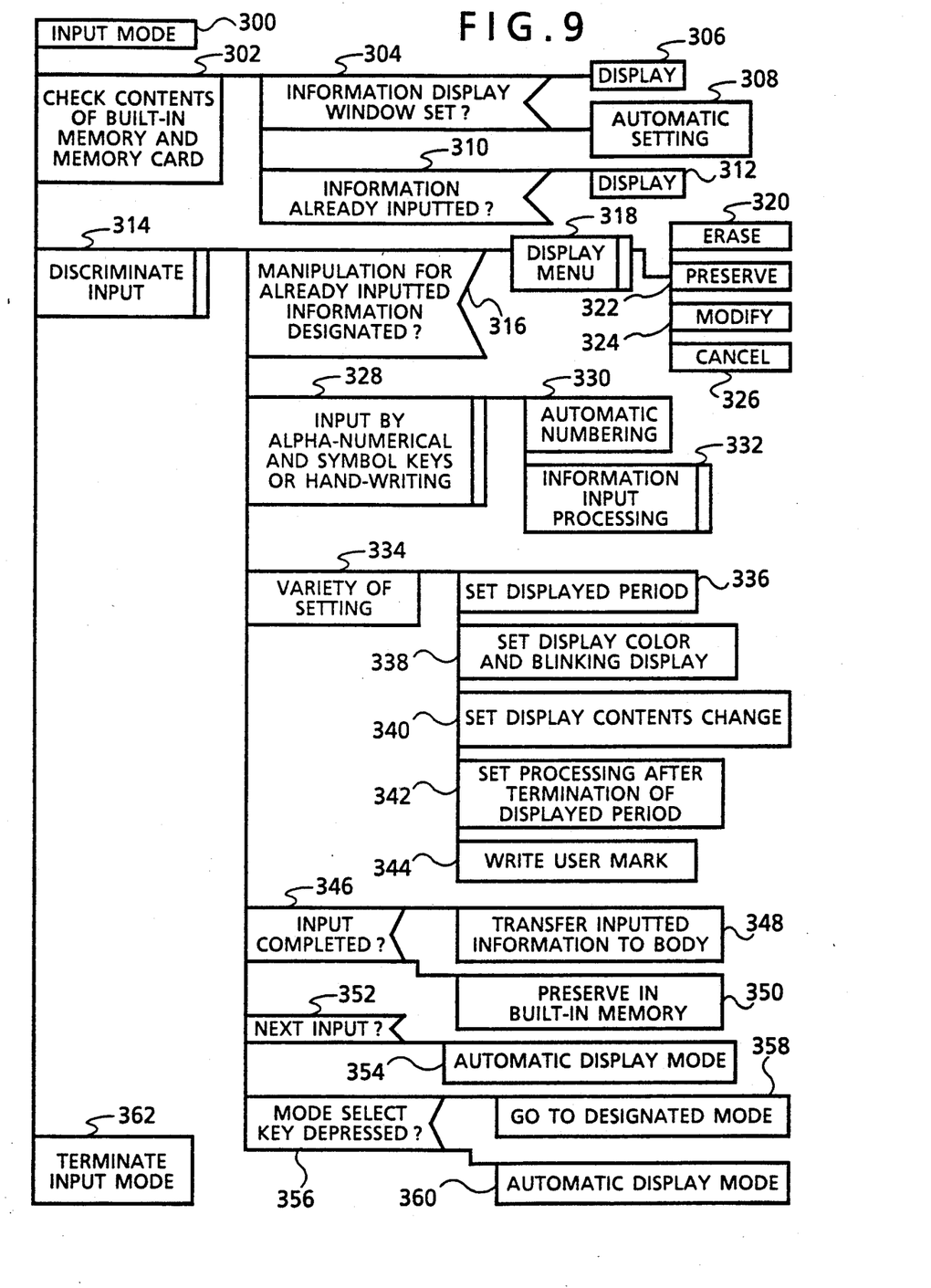
FIG. 9 is a flowchart showing a concept of manipulations performed in an input mode.

FIG. 9 is a flowchart showing a concept of manipulations performed in the input mode. When the input mode at step 300 is started, contents of the built-in memory 1 and the memory card are checked at step 302. Then, it is determined at step 304 whether or not an information display window has been set. If it has been set, the set information display window is displayed at step 306. If it has not been set, an information display window is automatically displayed by using the standard values stored in the ROM.

In parallel with the above-mentioned processing, it is determined at step 310 whether or not inputted information already exists. If inputted information exists, it is displayed. In parallel with the above-mentioned step 302, an input discrimination at step 314 is executed. More specifically, when a manipulation of already inputted information is designated at step 314, an erasure, a reservation in a memory card, and a modification of the information or a cancellation of manipulation are displayed as selectable items in a menu at step 318. Then, selected one from among erasure, preservation, modification and cancellation at steps 320-326 is performed.

When an information input is started at step 328 by the alpha-numerical and symbol keys 26 or by a handwriting on the transparent pressure-sensitive pad 24, the inputted information is automatically numbered at step 330, and input processing is executed at step 332 for the built-in memory 15 in the remote control unit 20.

When a display information input termination key is depressed or when a hand-written input end mark is inputted, a menu including a variety of display setting items shown in steps 336-344 is displayed at step 334. These items may be set ore by one, however, if they are not set, standard values provided in the system are used.

If it is determined at step 346 that an input termination is indicated by a key manipulation or a hand-written input, information held in the built-in memory 15 of the remote control unit 20 is transferred to the built-in memory 1 of the information display unit body 12 or to a memory card inserted into the body 12 at step 348 in accordance with a preset transfer mode. More specifically, if a display information input has been completed at this time, other display designating information is automatically set, and a transfer to the information display unit body 12 is executed. If a display information input has not been completed, a transfer to the information display unit body 12 is not executed and information is preserved in the built-in memory 15 in the remote control unit 20 or in a memory card at step 350. Such information is also automatically numbered, thereby making it possible to manage the information with the numbers and utilize the numbers for subsequent additional input or modification of information.

In either case of completion or incompletion of information input, if remaining amounts of the built-in memories 1 in the information display unit body 12 and the remote control unit 20 are running short, a memory management is performed such that the system automatically erases information in course of being inputted and erasure designated information to increase an effective area of the memories. If the memories have been nevertheless used up, a warning is displayed, and an instruction is issued to insert a memory card having a free space in which information is not written. When a memory card is inserted, the system checks a remaining amount of memory, backs up so designated information in the built-in memory 1 into the inserted memory card, erases the information in the built-in memory 1, and resumes information input.

If next information is inputted at step 352, the processing for the input mode is continued as it is. Contrarily, if no information is input for a predetermined time, the system returns to the automatic display mode at step 354.

If another mode select key is depressed, the input mode is terminated at step 356, and the system is set into a designated mode at step 358. If no mode select key is depressed for a predetermined time, the system returns to the automatic display mode at step 360.

Incidentally, if an input mode termination is designated at step 362, the system immediately returns to the automatic display mode.

Figure 10:
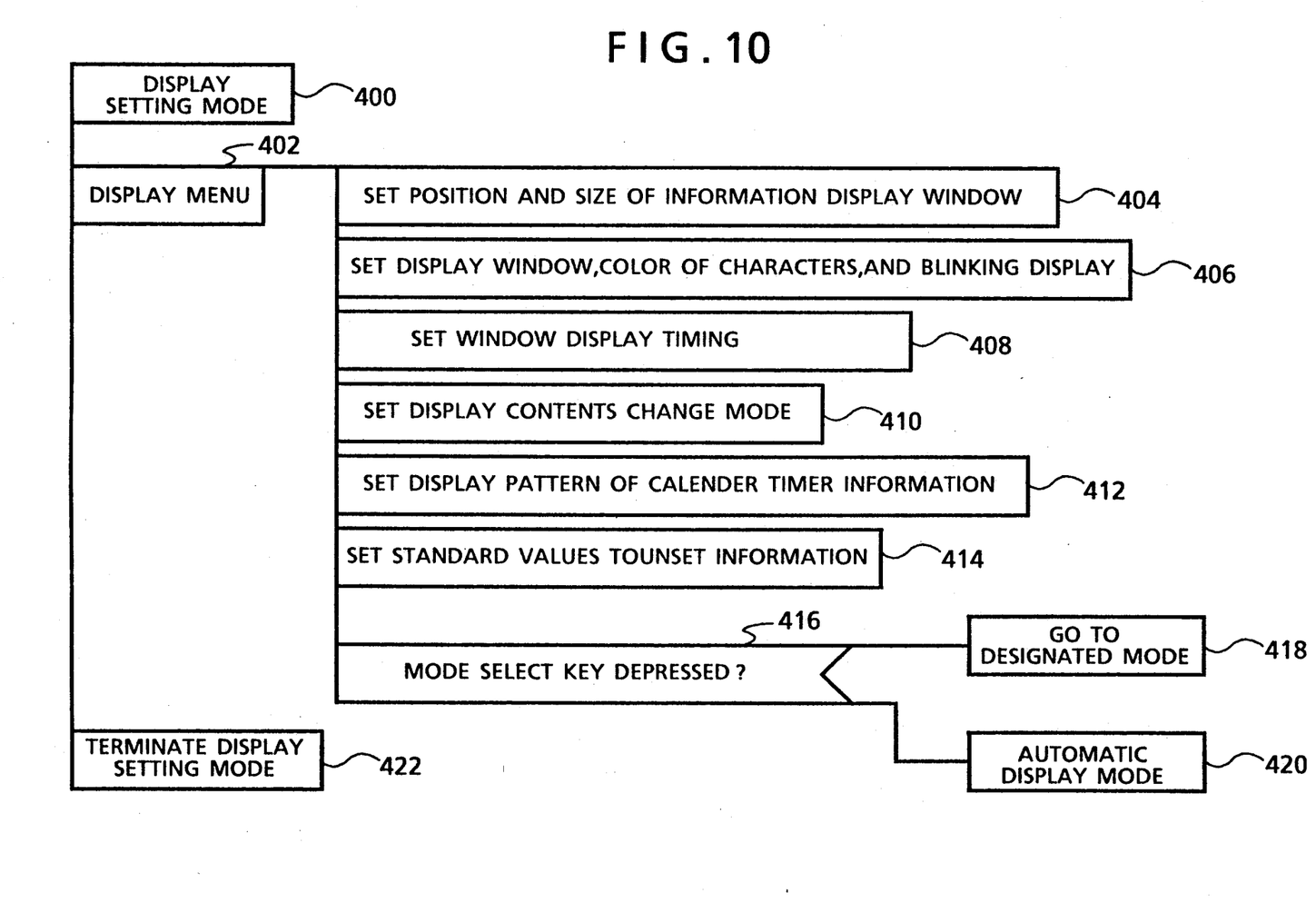
FIG. 10 is a flowchart showing a manipulation procedure in a display setting mode for setting a variety of items associated with display.

FIG. 10 is a flowchart showing a manipulation procedure in a display setting mode for setting a variety of items associated with display. A depression of the display setting mode key on the remote control unit 20 causes the system to enter the display setting mode at step 400 and display a menu at step 402. Selectable items from the menu includes setting of a position, size and color of a window to be displayed, a color of characters, a blinking display, a timing of displaying a window (for example, setting for always displaying a window for a certain time after the power supply is turned on), a display contents change mode, a display pattern of calender timer information, standard values assigned to unset information and so on, as shown in steps 404-412. Items which are not set at step 402 are automatically set to respective standard values at step 414. If another mode select key for selecting a different mode is depressed at step 416, the display setting mode 400 is terminated, and then the system proceeds to the mode designated at step 416. If no mode select key is depressed at step 416, the system proceeds to the automatic display mode at step 420 after the lapse of a predetermined period.

Incidentally, a depression of an end key causes the system to immediately return to the automatic display mode at step 422.

Figure 11:
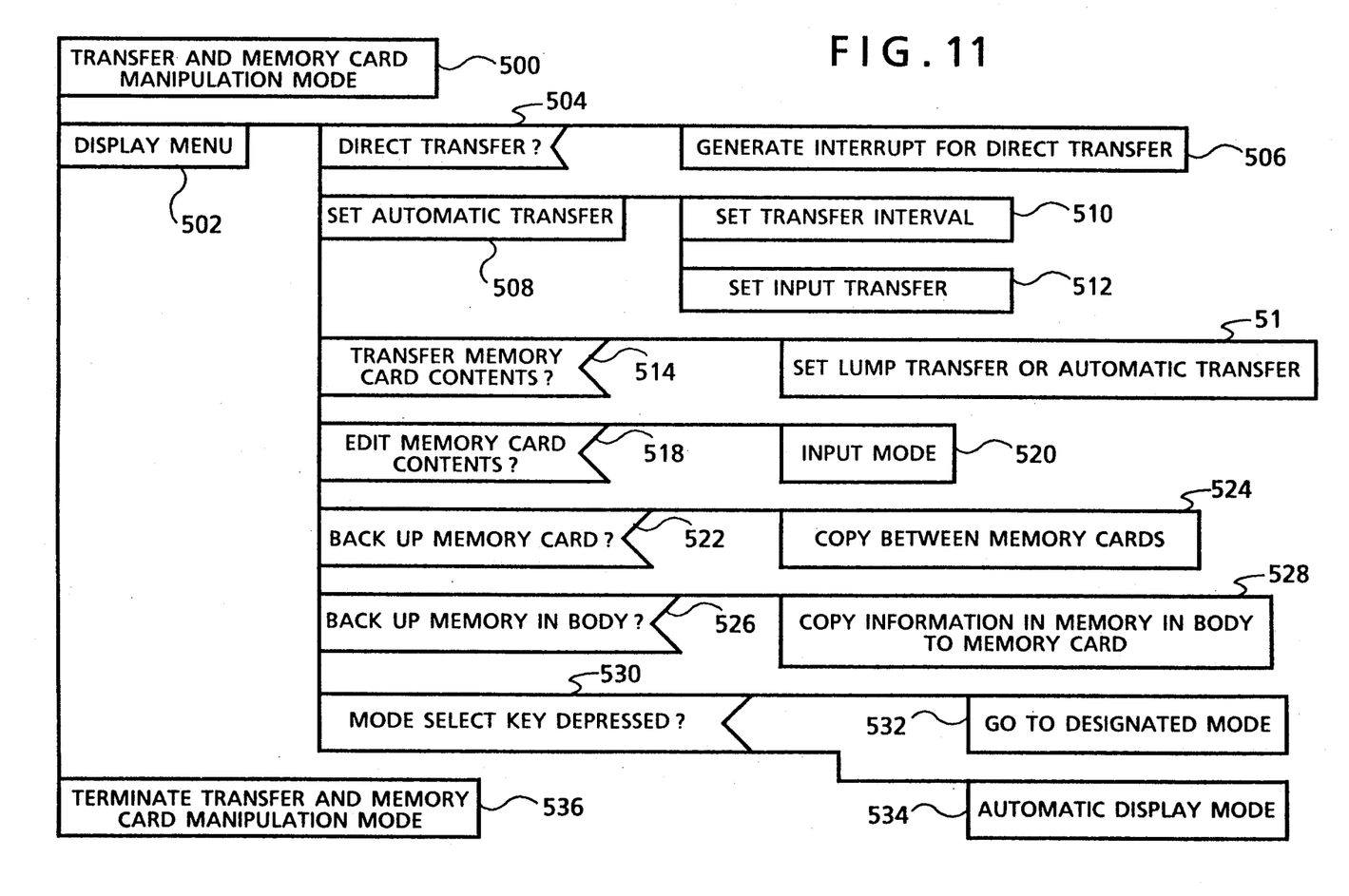
FIG. 11 is a flowchart showing a concept of processing performed in transfer and memory card manipulation modes.

FIG. 11 is a flowchart showing a concept of operations performed in transfer and memory card manipulation modes. When this transfer and memory card manipulation mode 500 is started, a menu is displayed at step 502 for setting an information transfer manipulation and a memory card contents manipulation (transfer, edit, backup and so on).

For executing a direct transfer at step 504, an interrupt is generated at step 506 to directly transfer display information. For automatically setting a transfer at step 508, a selection is made from an interval transfer for transferring information at intervals of a predetermined time at step 510 and an input time transfer for transferring information every time a predetermined amount of information at step 512 is inputted, and respective values are designated. For transferring contents of a memory card at step 514, an immediate batch transfer or a programmed automatic transfer is selected at step 516. For editing contents of a memory card at step 518, the system proceeds to the input mode shown in FIG. 9 at step 520, wherein necessary manipulations such as erasure, preservation, modification and cancellation are performed. For backing up a memory card at step 522, contents of a memory card are copied to another memory card at step 524. For backing up information stored in the built-in memory 1 in the information display unit body 12, the information in the memory is copied to a memory card. If it is determined at step 530 that the mode select key is depressed, the system proceeds to a designated mode at step 530. On the contrary, if it is determined that no mode select key is depressed, the system returns to the automatic display mode at step 534 after the lapse of a predetermined time.

As information stored in a memory card, those produced by a personal computer, a word processor or the like may be utilized. If such information processing apparatus is provided with a memory card interface, information can be written into the memory card in accordance with a predetermined format.

Also, as for general information, for example, a movie release day, events for social welfare, and so on, it is possible to utilize a service for inputting a memory card and purchase a memory card loaded with information, by way of example.

As mentioned above, a memory card which has information inputted therein by a certain means is inserted into the memory card slot 40 of the information display unit body 12, whereby the automatic display mode, explained with reference to FIG. 7, is started, wherein the flag for using a memory card is set to "on" at step 206, and then steps for executing automatic display are automatically executed. In this case, it is possible to display information stored in a memory card by the operation of the memory information processing circuit 16, without using the remote control unit 20.

Further, the use of the remote control unit 20 enables the user to edit and display information stored in a memory card in accordance with his or her taste.

As explained above, a variety of items except for display information input, if not specifically designated, are automatically set, so that the information display system of the present embodiment can be readily manipulated by users who do not know the system in detail. On the contrary, since a variety of items can be freely modified by designations made by users, requirements of expert users can be also satisfied.

According to the present embodiment, since manipulations for input, transfer, memory card and so on in a variety of modes are automatically set, the user can operate without taking into account the system, thereby eliminating mistakes, for example, forgetting a transfer, and accordingly further reducing the possibility of missing necessary information.

We claim:

1. An information display apparatus comprising:
    a first memory, coupled to said display apparatus, for storing arbitrary information, to which at least a desired display period is added;
    a first calendar timer, coupled to said display apparatus, for generating a time signal such as data;
    a remote control unit for permitting input of said arbitrary information and transferring said arbitrary information to said first memory, said remote control unit having an alphanumeric keypad and handwritten character recognizing means for recognizing input of handwritten characters;
    a second memory, coupled to said remote control unit, for storing said arbitrary information input by said remote control unit;
    a second calendar timer, coupled to said remote control unit, for generating a time signal such as data;
    means for synthesizing said arbitrary information stored in said first memory as a television image, and displaying the synthesized television image on a television display at a predetermined time derived on the basis of the time signal generated by said first calendar timer and said desired display period; and
    means for changing at least one of said arbitrary information contents such as, color, size, typeface on said television display in a predetermined manner, in accordance with said first calendar timer.

2. An information display apparatus according to claim 1, further comprising a memory card interface for both said display apparatus and said remote control unit, exchanging said arbitrary information physically by exchanging said memory card.

3. An information display apparatus according to claim 1, wherein one of said second calendar timer of said remote control unit and said first calendar timer coupled to said display apparatus comprises means for transmitting a synchronizing signal to the other calendar timer to synchronize the same with its time.

4. An information display apparatus according to claim 2, wherein one of said second calendar timer of said remote control unit and said first calendar timer coupled to said display apparatus comprises means for transmitting a synchronizing signal to the other calendar timer to synchronize the same with its time.

5. An information display apparatus according to claim 1 further comprising means for automatically starting a display mode and displaying necessary information when said calender timer indicates the arrival of a time at which information is to be displayed.

6. An information display apparatus according to claim 16 further comprising means for automatically starting a display mode and displaying necessary information when said calender timer indicates the arrival of a time at which information is to be displayed.

7. An information display apparatus according to claim 1 further comprising means for maintaining information, after it has been displayed, to be stored in said memory for a predetermined period.

8. An information display apparatus according to claim 2 further comprising means for maintaining information, after it has been displayed, to be stored in said memory for a predetermined period.

9. An information display apparatus comprising:
   a first memory, coupled to said display apparatus, for storing arbitrary information, to which at least a desired display period is added;
   a first calendar timer, coupled to said display apparatus, for generating a time signal such as date;
   a remote control unit for permitting input of said arbitrary information and transferring said arbitrary information to said first memory, said remote control unit having an alphanumeric keypad and handwritten character recognizing means for recognizing input of handwritten characters;
   a second memory, coupled to said remote control unit, for storing said arbitrary information input by said remote control unit;
   a second calendar timer, coupled to said remote control unit, for generating a time signal such as date;
   means for synchronizing said first calendar timer and said second calendar timer, by transferring a synchronizing signal from said remote control unit, when said arbitrary information is transferred;
   means for synthesizing said arbitrary information stored in said first memory in said display apparatus as a television image, and displaying the synthesized television image on a television display at a predetermined time derived on the basis of the time signal generated by said first calendar timer and said desired display period; and
   means for transferring said arbitrary information automatically, read out from said second memory to said first memory, in accordance with said time signal generated by said second calendar timer and said predetermined display period of said arbitrary information.

10. An information display apparatus according to claim 9, wherein said means for synthesizing information stored in said first memory and a television image includes means for changing at least one of display contents of the information read out of said first memory and a display method in accordance with said first calender timer.

11. An information display apparatus according to claim 9 further comprising means for automatically starting a display mode and displaying necessary information when said first calender timer indicates the arrival of a time at which information is to be displayed.

12. An information display apparatus according to claim 9 further comprising means for maintaining information, after it has been displayed, to be stored in said first memory for a predetermined period.

13. An information display apparatus according to claim 10 further comprising means for maintaining information, after it has been displayed, to be stored in said first memory for a predetermined period.

* * * * *